United States Patent

[11] 3,633,762

[72] Inventors Aldo Gnavi;
Giacomo Di Bartolomeo, both of Turin, Italy
[21] Appl. No. 13,412
[22] Filed Feb. 24, 1970
[45] Patented Jan. 11, 1972
[73] Assignee Compagnia Italiana Westinghouse Freni E. Segnali
Turin, Italy
[32] Priority Feb. 25, 1969
[33] Italy
[31] 50724-A/69

[54] AUTOMATIC SERVICE CONDUIT CONNECTOR DEVICES FOR RAILWAY VEHICLE COUPLINGS
6 Claims, 8 Drawing Figs.
[52] U.S. Cl. .................................................... 213/1.3, 213/100 W
[51] Int. Cl. ................................................... B61g 5/06, B61g 5/10
[50] Field of Search.......................................... 213/1.3, 1.6, 76, 100 W; 285/58, 63; 248/53, 67; 339/48

[56] References Cited
UNITED STATES PATENTS

| 3,421,636 | 1/1969 | Dufourmantel | 213/1.3 |
| 2,229,902 | 1/1941 | Robinson | 213/76 |
| 2,751,089 | 6/1956 | Scharfenberg | 213/1.3 |
| 3,387,714 | 6/1968 | Dawson | 213/76 |

Primary Examiner—Drayton E. Hoffman
Attorney—Sughrue, Rothwell, Mion, Zinn & Macpeak

ABSTRACT: Automatic connectors for service conduits associated with automatic railway vehicle couplings are in this invention displaceable relative to the respective coupling heads into engagement with each other in response to the approach of the coupling heads to interengagement, by a mechanical lever system such that the final interengagement of the connectors occurs only after the frontal impact between the coupling heads.

AUTOMATIC SERVICE CONDUIT CONNECTOR DEVICES FOR RAILWAY VEHICLE COUPLINGS

This invention relates to automatic connector devices for effecting automatic service conduit connections in automatic couplings for railway vehicles.

In order to couple two railway vehicles together automatically it is in general necessary to effect (a) automatic interengagement of mechanical couplings for transmitting both pulling and pushing forces between the vehicles, and (b) automatic interconnection of service conduits such as electrical cables and pneumatic or vacuum lines.

Among the conditions laid down for European push/pull automatic couplings by the U.I.C. (Union International Chemins de Fer) in agreement with the O.S.J.D. (Organizzazione per la collaborazione delle ferrovie), as issued by the Soviet Union, there is included the specific requirement that such couplings must be capable of direct coupling to the SA-3 type coupling used in the U.S.S.R. and having the so-called Willison profile.

This invention relates particularly to automatic connector devices for service conduits for use in conjunction with automatic railway vehicle couplings of the aforementioned Willison type. It is well known that in automatic couplings of this type interengagement of two coupling heads is accompanied by lateral displacement of the heads, in opposite directions, typically by about 40 mm. This displacement increases considerably the difficulty of achieving satisfactory automatic interconnection of service conduits associated with each coupling head. Moreover, the relative speed of the vehicles immediately preceding coupling thereof can be quite high.

In arranging for automatic interconnection of service conduits the following factors must be taken into account: (i) the group of service conduit connectors carried by each coupling head follows, in general, the movements of the coupling head; (ii) the service conduit connectors, during the approach of two coupling heads to automatic mechanical interengagement, may not be aligned, due to misalignment of the coupling heads during this approach; (iii) at the instant of interengagement of the coupling heads the service conduit connectors must be accurately aligned with each other to avoid friction between the respective end seals of the connectors after interengagement of the connectors.

It follows from factors (ii) and (iii) above that if the service conduit connectors of the automatic coupling approach each other at an excessive speed it is difficult to ensure that the interengaging connectors of the coupling heads are correctly aligned upon mechanical coupling of said heads. This difficulty is increased when a severe impact occurs between the connectors when the coupling heads collide with each other frontally, prior to the lateral shifting of the heads mentioned previously.

An object of the present invention is to provide an improved automatic connector device for a railway vehicle automatic coupling, in which reliable interconnection of service conduits can be effected automatically in operation of the coupling. More particularly, the invention aims to avoid or minimize the above-mentioned difficulties associated with such connector devices.

The invention accordingly provides device for effecting automatic service conduit connections in an automatic coupling for railway vehicles of the kind having interengageable coupling heads with frontal impact faces, characterized in that each coupling head has a conduit connector member associated therewith and displaceable relative to the head in a direction substantially perpendicular to the frontal impact face of the respective head, and characterized by means responsive to the approach to coupling of two such cooperating coupling heads to effect relative movement between the respective connector members and the respective coupling heads so as to effect operative interengagement of said connector members only after impact of the two frontal impact faces of the coupling heads has occurred.

The invention will now be described, by way of nonlimiting example, with reference to the accompanying drawings, in which.

The arrangement and operation of the coupling shown in FIGS. 1 to 4 will first be described.

Figure 1:
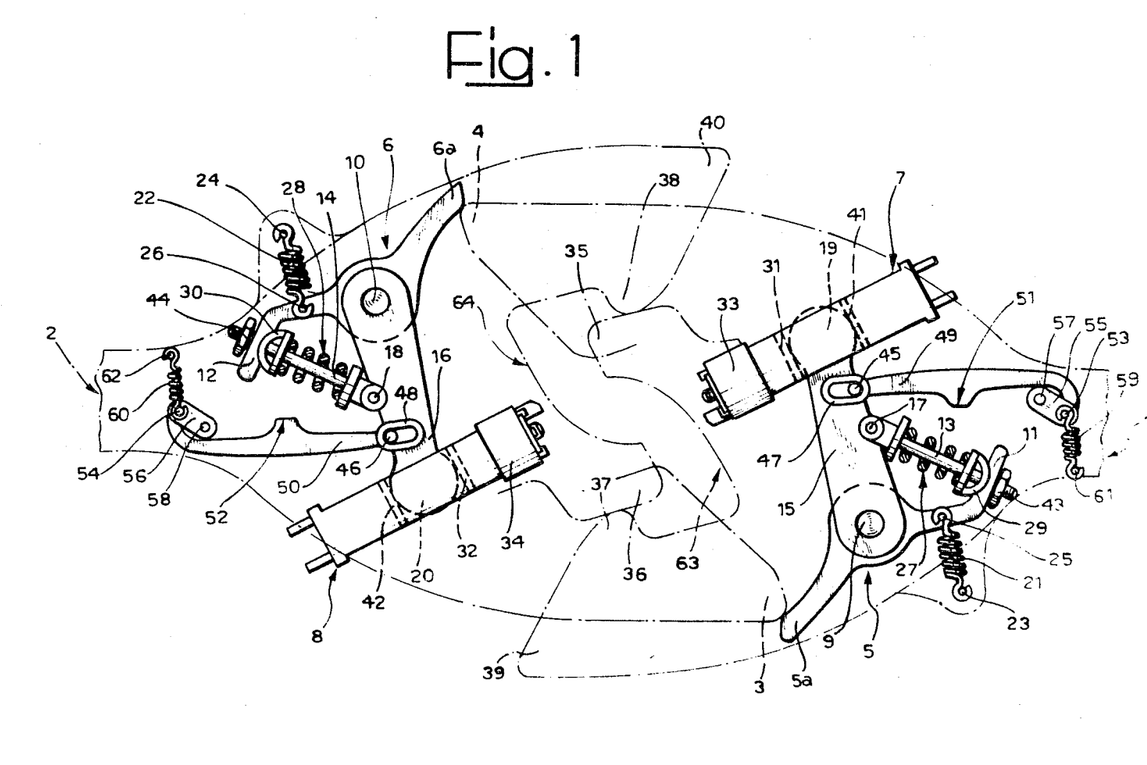
FIG. 1 is a diagrammatic plan view of an automatic coupling incorporating automatic connector devices according to one embodiment of the invention, in its initial position at the start of the coupling operation.

The coupling comprises two identical coupling heads 1, 2 shown in broken outline, each of the Willison profile.

Upon the initial approach of the coupling heads 1, 2 towards each other, respective forwardly extending hornlike projections 3, 4 on the heads 2, 1 initially make contact with respective arms 5a, 6a of respective sensing levers 5, 6 pivoted about fixed pivot pins 9, 10 on the respective heads 1, 2, causing initial rotation of said sensing levers 5, 6 anticlockwise (as viewed).

Referring to the respective coupling head 1; 2, each sensing lever 5; 6 has a further arm 11; 12 which provides a support for relative sliding movement of a guide rod 13; 14 which is pivotally connected at a pivot pin 17; 18 to an intermediate point on a respective operating lever 15; 16 and which is surrounded by a respective helical spring 27; 28. The spring 27; 28 urges the lever arm 11; 12 away from the operating lever 15; 16.

The operating lever 15; 16, which is also pivoted about the pivot pin 9; 10, has a rounded free end 19; 20 which lies between a respective pair of external lugs 31, 41; 32, 42 provided on the casing of a connector member 7; 8. The connector member 7; 8 is carried by the coupling head 1; 2 and is displaceable relative thereto in a direction substantially perpendicular to a respective frontal impact face 63; 64 of the head 1; 2. Each connector member 7; 8 carries a group of service conduit connectors, including, for example, electrical, pneumatic and vacuum line couplings, known per se.

The operating lever 15; 16 is provided, intermediate the pivot pin 17; 18 and the free end 19; 20, with a pin 45; 46 which engages in a slot 47; 48 formed at one end of a stop link 49; 50, forming a lost motion connection between the lever 15; 16 and the link 49; 50. The stop link 49; 50 carries at its opposite end a pin 53; 54 which forms a pivot connection between the stop link 49; 50 and a toggle link 55; 56, the latter being pivotally connected to the respective coupling head 1; 2 by a pivot pin 57; 58. The links 49, 55; 50, 56 form a respective toggle linkage which is biased into locked position by a helical spring 59; 60 anchored to the head 1; 2 at 61; 62. In this locked position the pivot pin 57; 58 is displaced from the line interconnecting the pins 45, 53; 46, 54 on the side thereof such that a traction force (i.e., to the left as viewed) along said line gives rise to a moment about the pivot pin 57; 58 in the same sense as that due to the spring 59; 60.

Upon the above-mentioned initial anticlockwise rotation of each sensing lever 5; 6, which takes place against the action of a respective return spring 21; 22 interconnecting a pin 25; 26 on the sensing lever arm 11; 12 and a fixed pin 23; 24 on the head 1; 2, the spring connector 13; 14 causes the respective operating lever 15; 16 to make a small initial movement, anticlockwise as viewed, until the pin 45; 46 is located at the end of the slot 47; 48 remote from the pivot pin 57; 58, whereafter further movement of the operating lever 15; 16 and, therefore, of the connector member 7; 8 is prevented by the stop link 49; 50 in its blocking position. This is the position shown in FIG. 2, at the end of the first phase of relative movement of the connector member 7; 8 and the respective coupling head 1; 2.

As each coupling head 2; 1 advances further towards the other the projection 3; 4 causes further rotation of the sensing lever 5; 6 anticlockwise. This rotation, as a consequence of the aforesaid blocking action of the stop link 49; 50 on the operating lever 15; 16, causes further compression of the spring 27; 28 between the lever arm 11; 12 and the pivot pin 17; 18, until the free end of the lever arm 11; 12, which is rounded, abuts an intermediate land 51; 52 on the stop link 49; 50. This is the position shown in FIG. 3, and is reached immediately after frontal impact of a protuberance 35; 36 of the coupling head 1; 2 against a bottom surface 64; 63 of the other head 2; 1 has occurred. It will be noted that the blocking of the operating lever 15; 16 by the stop link 49; 50 takes place before the frontal impact: this prevents the transmission to the connector member 7; 8 and its associated displacing mechanism of shocks, which would otherwise result from said impact.

Adjustment of the initial angular position of the lever arm 11; 12 relative to the operating lever 15; 16 can be effected by adjustment of the position of a stop nut 43; 44 carried on the free end of the guide rod 13; 14, which is threaded. Such adjustment ensures that the operating lever 15; 16 is blocked by the stop link 49; 50 before frontal impact of the heads 1; 2 takes place.

Figure 4:
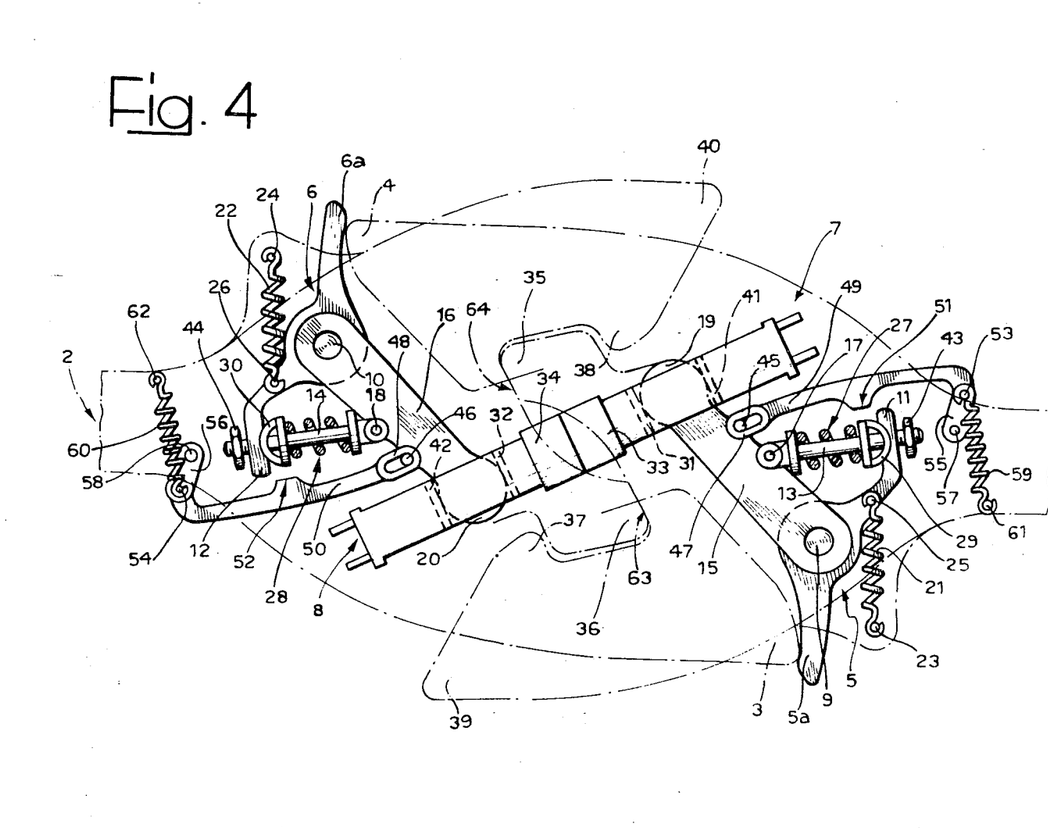
FIG. 4 is a plan view of the said coupling in its coupled state after the final coupling phase.

Further advance of each coupling head 1; 2 towards the other is accompanied by lateral sliding movement along the frontal impact face 63; 64 of the protuberance 36; 35 of the other head 2; 1, until the two heads 1; 2 are fully interengaged, when the protuberances 35; 36 of the heads 1; 2 will be located behind respective projecting noses 38; 37 of the heads 2; 1. The two connector members 7; 8 are then coaxially aligned. This final phase of the coupling operation is accompanied by a further slight anticlockwise rotation of the sensing lever 5; 6, which causes the lever arm 11; 12 to rock the stop link 49; 50 in an anticlockwise direction about the pin 45; 46. When the pivot pin 57; 58 passes, as a result of this movement, over to the other side of the line joining the pins 45; 46 and 53; 54, the toggle 49, 55; 50, 56 becomes unstable and is broken or released, thereby permitting movement of the stop link 49; 50 from its blocking position. When the stop link 49; 50 is thus released the energy stored in the spring 27; 28 causes anticlockwise rotation of the respective operating lever 15; 16 (as viewed), the strength of the spring 27; 28 being greater than that of the spring 59; 60. Consequently the connector member 7; 8, which is now coaxially aligned with the other connector member 8; 7, is advanced relative to the coupling head 1; 2 so that the two connector members 7; 8 operatively interengage. This is illustrated in FIG. 4, which represents the end of the final stage of the coupling operation.

When the vehicles joined by the coupling are to be uncoupled, the coupling heads 1, 2 are disengaged from each other by the action of a release mechanism, not shown. When the uncoupled vehicles separate, the coupling heads 1, 2 recede from each other, so that when the projection 3; 4 of the head 2; 1 moves from the position shown in FIG. 4, the sensing lever 5; 6 of the other head 1; 2 rotates clockwise, as viewed, about the pivot pin 9; 10 under the action of the return spring 21; 22, towards the position shown in FIG. 1.

Figure 2:
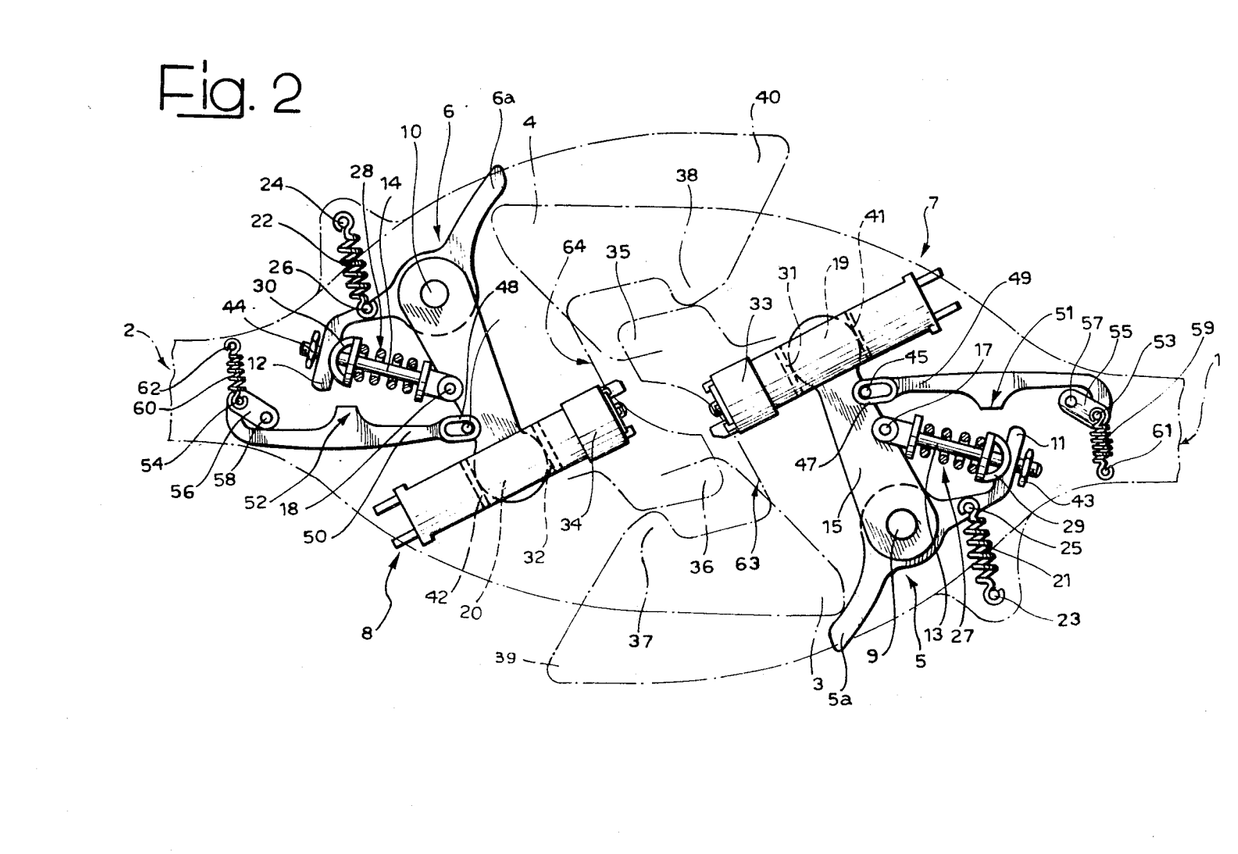
FIG. 2 is a plan view of the coupling of FIG. 1, in an intermediate phase during the approach of the two coupling heads, after a first phase of the coupling operation.

As a result of this return movement of the sensing lever 5; 6 the compression of the spring 27; 28 is relieved, the latter returning to the position of maximum distension shown in FIGS. 1 and 2, in which the stop nut 43; 44 on the guide rod 13; 14 comes into contact with the sensing lever arm 11; 12. The continued clockwise rotation of the sensing lever 5; 6 carries with it the operating lever 15; 16 by virtue of the now rigid connection afforded by the guide rod 13; 14, and this in turn causes retraction of the connector member 7; 8 relative to the head 1; 2, disengaging the connector members 7; 8 from each other.

Figure 3:
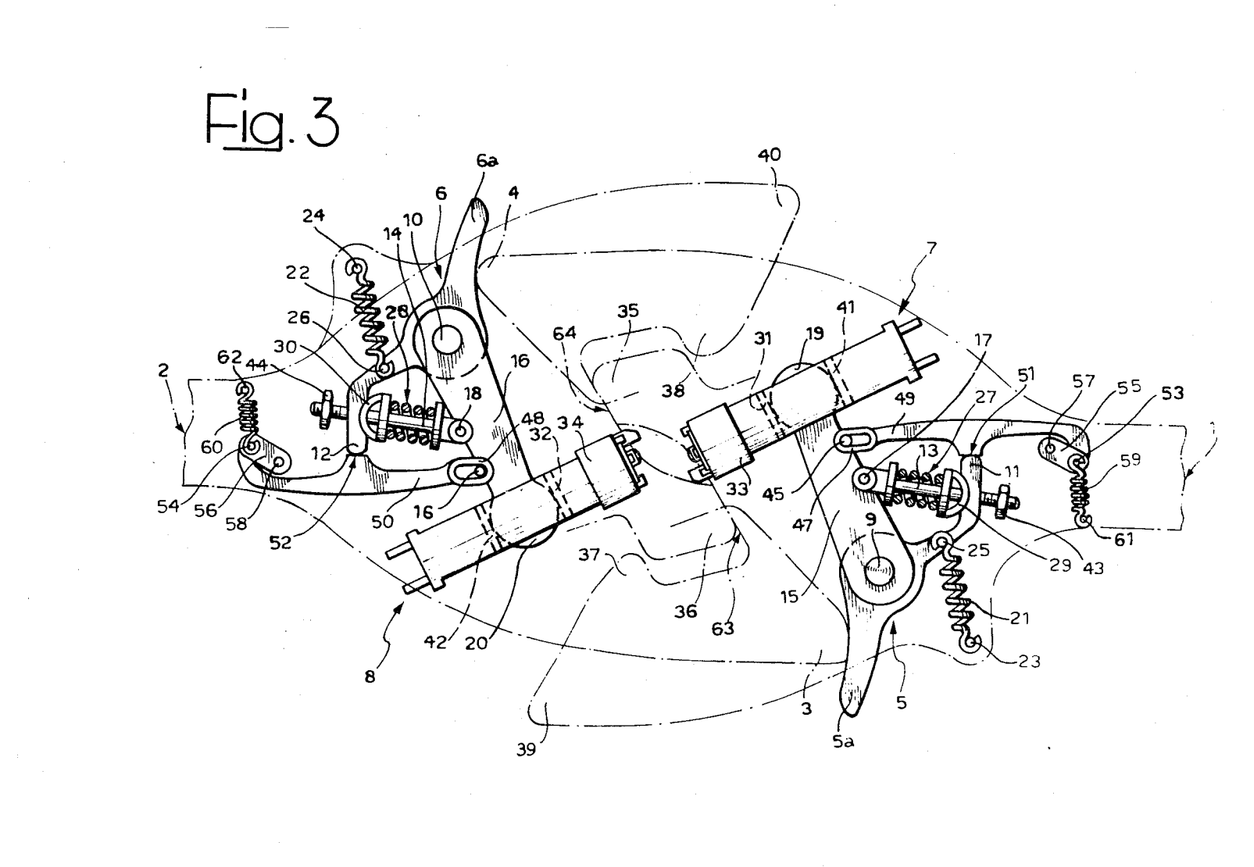
FIG. 3 is a plan view of the said coupling at a further phase of the automatic coupling operation, immediately after the frontal impact of the coupling heads.

During this movement of the operating lever 15; 16 the stop link 49; 50 is displaced simultaneously in the same direction under the influence of the spring 59; 60 acting through the toggle link 55; 56. However, the pin 45, 46 remains at the end of the slot 47; 48 in the stop link 49; 50 remote from the respective pivot pin 57; 58. Upon completion of the movement of the stop link 49; 50 the pivot pin 53, 54 is sufficiently displaced to enable the spring 59; 60 to return the toggle link 55; 56 to its stable locked position (FIGS. 1–3). The continued clockwise rotation of the operating lever 15; 16 causes the pin 45; 46 to move to the opposite end of the slot 47; 48 nearest the pivot pin 57; 58.

It will be seen that the various components of the coupling head 1; 2 have resumed automatically the original positions of FIG. 1, the return spring 21; 22 ensuring that the end of the sensing lever arm 11; 12 is withdrawn from engagement with the intermediate land 51; 52 of the stop link 49; 50.

In the embodiment of FIGS. 5, 6, 7 and 8 components corresponding to the embodiment of FIGS. 1 to 4 are indicated by the same reference numerals.

Figure 5:
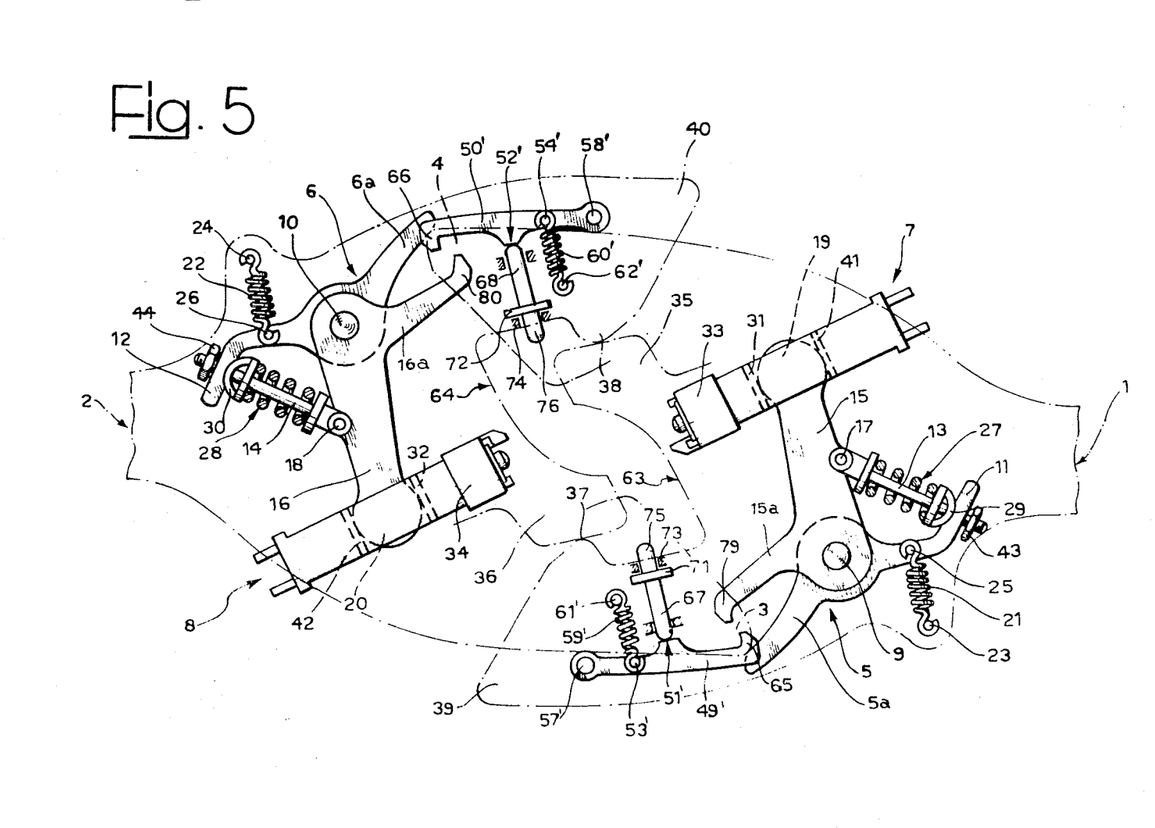
FIGS. 5, 6, 7 and 8 are diagrammatic plan view, corresponding to FIGS 1, 2, 3 and 4 respectively, of a coupling incorporating connector devices according to another embodiment of the invention, in four successive phases of the coupling operation.

In this embodiment the stop link 49; 50 is replaced by a stop lever 49'; 50' pivoted at one end by a pivot pin 57'; 58** to the coupling head 1; 2 and provided at its other end with a hooklike tooth 65; 66 adapted to engage a cooperating hooked end 79; 80 of one arm 15a; 16a of the operating lever 15; 16 to block the operating lever.

FIG. 5 shows the two coupling heads 1, 2 in the initial phase of the coupling operation, in which the projection 3; 4 of each head 2; 1 has just made contact with the end of the sensing lever arm 5a; 6a during the approach of the coupling heads.

Analogously to the operation of the previously described embodiment the anticlockwise rotation of the sensing lever 5; 6 caused by the initial approach of the coupling heads causes anticlockwise rotation of the operating lever 15; 16 through the action of the spring 27; 28, and this in turn advances the connector member 7; 8 relative to the coupling head 1; 2.

Figure 6:
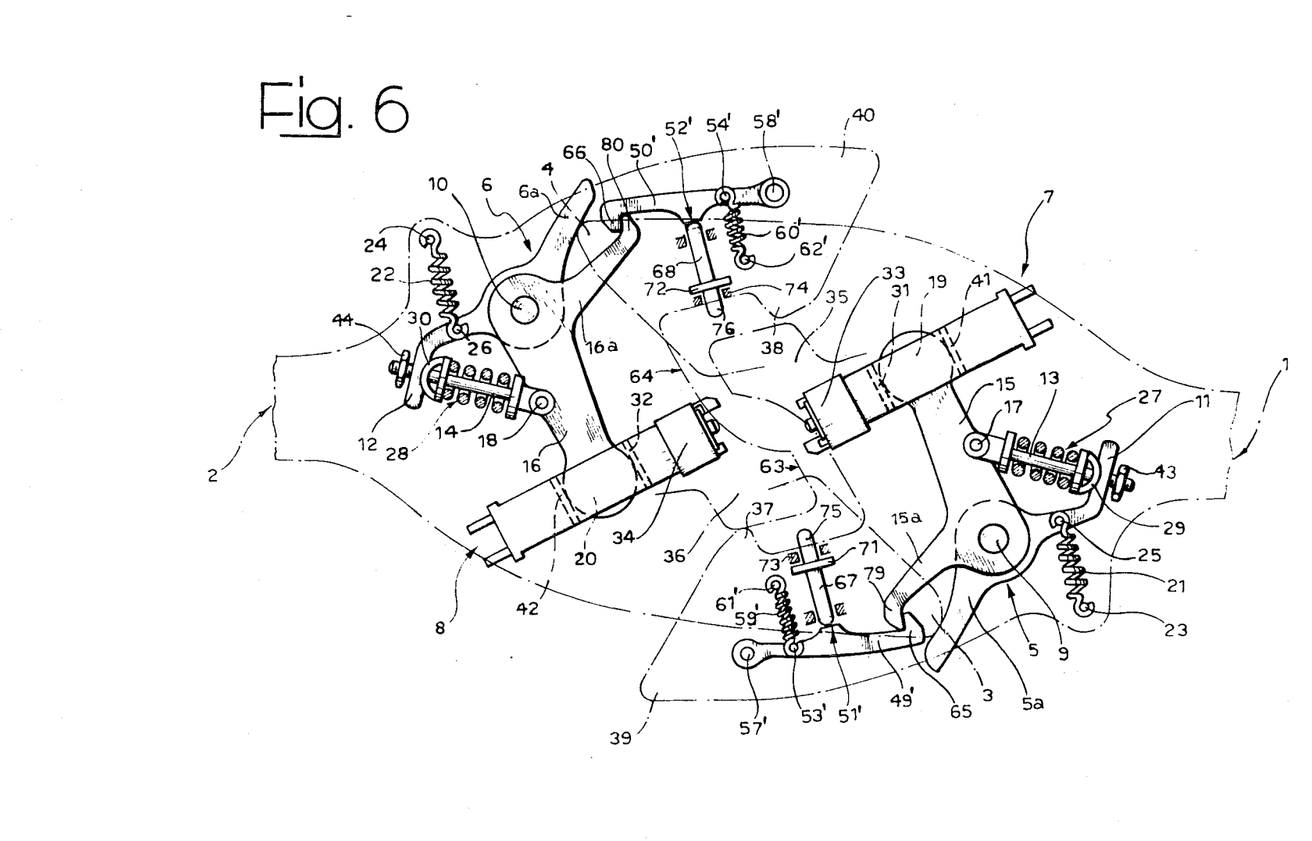
Figure 7:
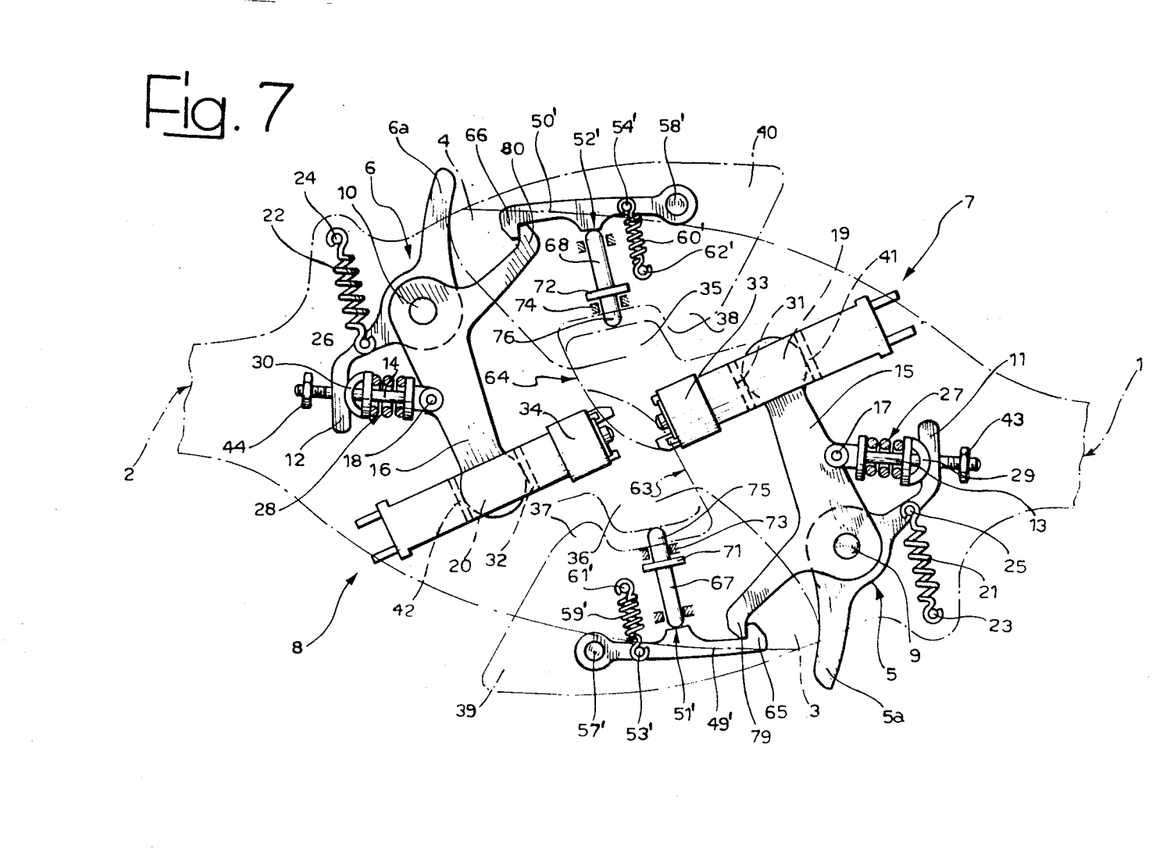

The clockwise rotation of the operating lever 15; 16 is halted by the engagement of the hooked end 79; 80 of the arm 15a; 16a with the tooth 65; 66 of the stop lever 49'; 50', the latter being held in its blocking position by a biassing spring 59'; 60' attached to an intermediate pin 53'; 54' carried by the lever 49'; 50' and anchored at its other end to a pin 61'; 62' on the head 1; 2. This intermediate phase of the coupling operation, in which advance of the connector member 7; 8 is halted, is illustrated in FIG. 6. Further advance of the coupling head 1; 2 towards the other head 2; 1 causes further compression of the spring 27; 28 while the operating lever 15; 16 remains blocked by the stop lever 49'; 50', until the impact face 63; 64 of the head 1; 2 collides with the protuberance 36; 35 of the other head 2; 1; the condition of the heads 1; 2 immediately after the frontal impact therebetween is shown in FIG. 7.

Figure 8:
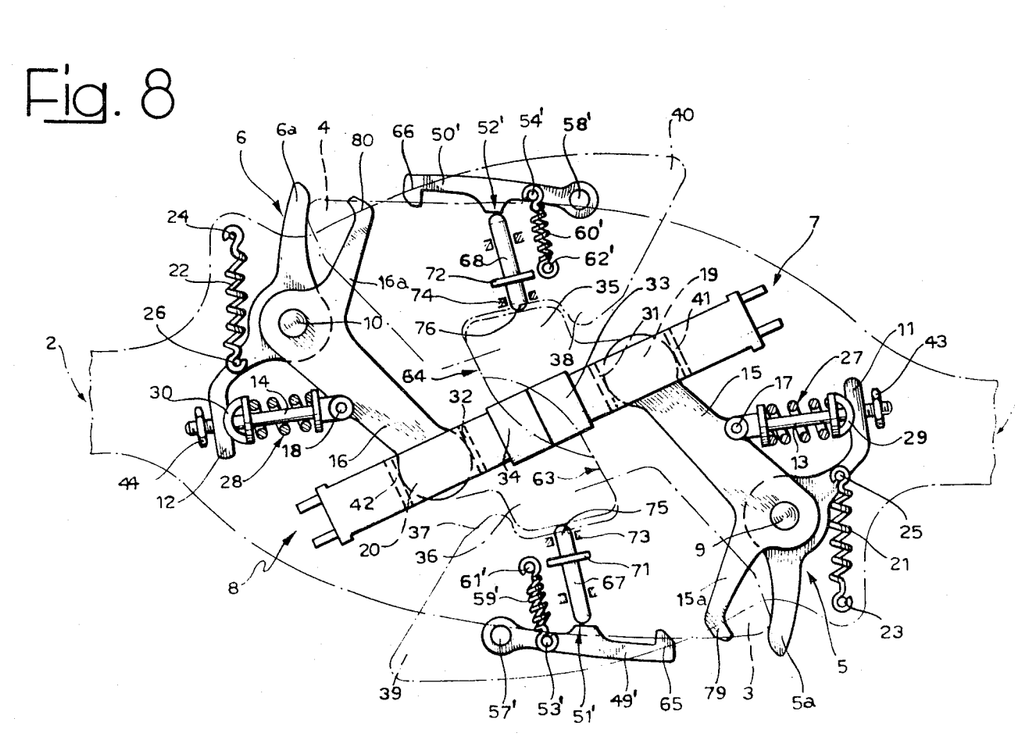

In the final phase of the coupling operation, the protuberance 35; 36 of the head 1; 2 slides laterally on the impact face 64; 63 of the other head 2; 1 until it is 85 behind the inwardly projecting nose 38; 37 of the latter. During this movement of the coupling head 2; 1 the laterally outwardly facing surface of the protuberance 36; 35 engages a rounded projecting end 75; 76 of a plunger 67; 68 mounted for axial sliding movement in a wing 39, 40 of the coupling head 1; 2. The other end of the plunger 67; 68 bears against an intermediate land 51'; 52' on the locking lever 49'; 50', the biassing spring 59'; 60' urging the plunger 67; 68, through the lever 49'; 50', into its projecting position, in which a flange 71; 72 carried by the plunger 67, 68 engages a stop surface 73; 74 in the wing 39; 40 of the coupling head 1; 2.

As the protuberance 36; 35 of the coupling head 2; 1 slides laterally on the impact face 63; 64 of the head 1; 2 the plunger 67; 68 is urged against the land 51'; 52', rocking the stop lever 49', 50' clockwise against the action of the spring 59'; 60', until the connector member 7 is coaxially aligned with the connector member 8. At this stage the tooth 65; 66 releases the hooked end 79; 80 of the operating lever, permitting anticlockwise rotation of the operating lever 15; 16 under the action of the spring 27; 28. This causes interengagement of the end 33 of the connector member 7 with the cooperating end 34 of the aligned connector member 8. The coupling heads 1 and 2 are then fully interengaged, as shown in FIG. 8.

The mechanical arrangement for halting the advance of the connector members relative to their respective coupling heads after an initial movement of the respective operating lever in response to the initial engagement of the approaching coupling heads, and prior to impact of the heads on each other, may take other forms. For example a stop member may be pivoted at one end on the operating lever and provided at its other end with a tapering slot in which there is located a fixed pivot pin joined to the respective coupling head. The stop member may be biassed by a spring to assume, during the initial unobstructed movement of the operating lever in the first phase of the coupling operation, a position in which said fixed pivot pin occupies the narrowest portion of the slot. At the start of the final stage of the coupling operation, after the frontal impact of the two coupling heads, the slot of the stop member is shifted to a position in which the fixed pivot pin occupies the widest portion of the slot.

The automatic connector devices herein described permit movement of the conduit connector members of the coupling towards each other in three successive stages: a first rapid advance of the connector members towards each other, effected by the initial contact between the coupling heads; an intermediate phase in which advance of the connector members relative to the coupling heads is stopped, and a final, relatively slower, advance of the connector member to union therebetween after impact between the coupling heads. The control of the connector members can be effected by a pneumatic control device comprising a cylinder anchored at one end to the respective coupling head and having a piston sliding therein and connected to the operating lever. A controlled air leak from the compressed air chamber of the cylinder may take place through a controlled restrictor, so that the flow resistance of said restrictor increases asymptotically with the piston position towards the end of the coupling stroke of the piston.

We claim:

1. In an automatic railway vehicle coupling having interengageable coupling heads with frontal impact faces, and associated service conduits, a device for effecting automatic interconnection of the service conduits, comprising a conduit connector member associated with each coupling head and displaceable relative to the head in a direction inclined to the frontal impact face thereof, and means responsive to the approach to coupling of the two cooperating coupling heads to effect relative movement between the connector members and the respective coupling heads whereby operative interengagement of said connector members is effected only after impact of the two frontal impact faces of the coupling heads has occurred; said means for effecting relative movement between the connector member comprise means for effecting an initial movement in which the connector member of one head is advanced towards the connector member of the other head as the two heads first engage, stop means for halting relative movement of the connector member while impact between the frontal impact faces of the coupling heads occurs, and means for effecting a final movement of the two connector members into engagement with each other.

2. In an automatic railway vehicle coupling having interengageable coupling heads with frontal impact faces, and associated service conduits, a device for effecting automatic interconnection of the service conduits, comprising a conduit connector member associated with each coupling head and displaceable relative to the head in a direction inclined to the frontal impact face thereof, and means responsive to the approach to coupling of the two cooperating coupling heads to effect relative movement between the connector members and the respective coupling heads whereby operative interengagement of said connector members is effected only after impact of the two frontal impact faces of the coupling heads has occurred; said means for effecting relative movement between the connector member and its respective coupling head comprises an operating lever pivoted at one end to the respective head and pivotally engaging the respective connector member at its other end, a sensing lever pivoted between its ends to the coupling head, said sensing lever having one arm arranged to cooperate, throughout the approach of the coupling head into interengagement with a cooperating coupling head, with a projection on the cooperating head, and further having an arm, a resilient connection between the arm and the operative lever whereby movement may be transmitted to the operating lever from the sensing lever, a movable stop member which in a blocking position limits angular movement of the operating lever after an initial movement upon the initial engagement of the sensing lever by the cooperating coupling head, and means releasing the stop member from its blocking position to permit a final movement of the operating lever and of the connector member under the action of said resilient connection after impact of the coupling heads has occurred.

3. Device according to claim 2, wherein the means releasing the stop member from its blocking position comprise an arm of the sensing lever which, upon displacement of the sensing lever by the coupling head engaged therewith following impact of the two coupling heads, displaces the stop member from its blocking position.

4. Device according to claim 3, wherein the stop member comprises a stop link having at one end a pin and slot lost motion connection to the respective operating lever and having at its other end a pivot connection the respective coupling head including a toggle link, resilient means biassing the toggle link into a position in which it holds the stop link in its blocking position, the said arm of the sensing lever engaging the stop link intermediate its ends upon movement of the sensing lever following impact of the two cooperating coupling heads to displace the stop link so as to release the toggle formed by the stop link and the toggle link and permit movement of the stop link from its blocking position.

5. Device according to claim 2, wherein the stop member comprises a stop lever pivoted at one end to the coupling head and carrying at its other end a hooklike tooth and the operating lever has an arm provided with a hooked end, and including a biassing spring urging the stop lever into a blocking position in which said tooth engages the hooked end of said arm.

6. Device according to claim 4, wherein the means releasing the stop lever from its blocking position comprises a plunger mounted for sliding movement in the respective coupling head and engageable directly by the other coupling head after impact of the two heads.

* * * * *